(12) United States Patent
Singh et al.

(10) Patent No.: US 9,021,066 B1
(45) Date of Patent: Apr. 28, 2015

(54) PROVIDING A-PRIORI INFORMATION ABOUT IMPLICATION OF OPERATOR INTERACTION WITH NETWORK DEVICE

(75) Inventors: Ravi Singh, Burlingame, CA (US); Ashwin Sampath, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 283 days.

(21) Appl. No.: 13/534,922

(22) Filed: Jun. 27, 2012

Related U.S. Application Data

(60) Provisional application No. 61/624,064, filed on Apr. 13, 2012.

(51) Int. Cl.
| | |
|---|---|
| *G06F 15/173* | (2006.01) |
| *G06F 15/177* | (2006.01) |
| *H04L 12/24* | (2006.01) |
| *H04L 12/26* | (2006.01) |

(52) U.S. Cl.
CPC .............. *H04L 41/14* (2013.01); *H04L 43/062* (2013.01)

(58) Field of Classification Search
CPC ... H04L 12/2697; H04L 41/14; H04L 41/145; H04L 41/147; H04L 43/062
USPC ........................................................ 709/220
See application file for complete search history.

(56) References Cited

U.S. PATENT DOCUMENTS

| | | | | |
|---|---|---|---|---|
| 7,990,993 | B1* | 8/2011 | Ghosh et al. .................. | 370/428 |
| 8,139,492 | B1* | 3/2012 | Peterson et al. .............. | 370/238 |
| 2006/0174154 | A1* | 8/2006 | Gous et al. ........................ | 714/4 |
| 2008/0065702 | A1* | 3/2008 | Dickerson et al. ............ | 707/202 |
| 2011/0194557 | A1* | 8/2011 | Baban et al. .................. | 370/390 |

OTHER PUBLICATIONS

U.S. Appl. No. 12/618,536, filed Nov. 13, 2009, entitled Multi-Router System Having Shared Network Interfaces.
U.S. Appl. No. 12/759,850, filed Apr. 14, 2010, entitled Deadlock-Resistant Fabric Tree Replication in a Network Device.

* cited by examiner

*Primary Examiner* — Jeong S Park
(74) *Attorney, Agent, or Firm* — Shumaker & Sieffert, P.A.

(57) ABSTRACT

Techniques are described for providing a-priori information about the implication of a network device operator interaction with a network device, e.g., a software configuration or hardware change, to be performed on the network device before the interaction actually takes place. The network device operator is provided with information that may be used to make a decision whether to proceed with the interaction. For each logically distinct feature of a network device, the techniques generate a trigger outcome domain (TOD). Each TOD is defined to include a list of operator interactions that defines relevant events in the network device that may be triggerable by the operator interactions, a list of potential outcomes in the network based on the potential events in the network device, and a user interface to display the list of potential outcomes for the operator interactions prior to performing any of the interactions.

23 Claims, 5 Drawing Sheets

PROVIDING A-PRIORI INFORMATION ABOUT IMPLICATION OF OPERATOR INTERACTION WITH NETWORK DEVICE

This application claims the benefit of U.S. Provisional Patent Application 61/624,064 filed Apr. 13, 2012, the entire content of which is incorporated herein by reference.

TECHNICAL FIELD

The invention relates to computer networks and, more particularly, to systems for routing packets within the networks.

BACKGROUND

A computer network is a collection of interconnected network devices that can exchange data and share resources. In a packet-based network, such as an Ethernet network, the network devices communicate data by dividing the data into small blocks called packets, which are individually routed across the network from a source device to a destination device. The destination device extracts the data from the packets and assembles the data into its original form.

The network devices may include routers, security appliances, network switches, wireless access points, or the like. Routers, for example, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

Network Service Providers (NSPs) maintain network devices, including routers, to provide Internet access and other services to customers and to communicate network traffic across a service provider network, such as the Internet. Examples of services that the NSP may provide include Voice over IP (VOIP), access for Asynchronous Transfer Mode (ATM) or frame relay communications, Internet protocol (IP) data services, and multimedia services, such as video streaming. Due to the constantly evolving end-user application features that request ever-newer requirements of the network devices, a network device operator of the NSP will never reach a stage where the service provider network has all the services and features that will ever be needed by its customers. The network device operator, therefore, is constantly in the process of enabling new software features for the routers and other network devices of the service provider network as the features become available.

From the viewpoint of the network device operator, the sole understanding of the new features is based on what is described in the technical documentation or industry literature. Dependencies between software internal state and the event being performed by the network device operator are non-obvious to the network device operator. The network device operator does not always know in advance the implications of an interaction with a network device via a configuration change or a hardware event. An action by the network device operator can end up triggering undesirable events in the service provider network that may cause traffic-losses, or even network unreachability, depending on the feature, for the customers.

SUMMARY

In general, techniques are described for providing a-priori information about the implication of a network device operator interaction with a network device before the interaction actually takes place. By providing advance information about the repercussions of a potential future interaction, e.g., a software configuration or hardware change, to be performed on the network device, the network device operator will be provided with information that may be used to make a decision whether to proceed with the interaction. For example, if the advance information indicates that the planned interaction would have an undesirable outcome, e.g., traffic loss or network unreachability, the network device operator may decide to not proceed with the interaction in order to prevent the undesirable outcome.

For each logically distinct feature of a network device, the techniques generate a trigger outcome domain (TOD). Each TOD is defined to include a list of operator interactions, a list of potential outcomes, and a user interface to display the list of potential outcomes for the operator interactions prior to performing any of the interactions. The list of operator interactions includes a list of relevant events in the network device that may be triggerable by the network device operator interacting with the network device via at least one of software configuration and hardware change. The list of potential outcomes includes a list of potential outcomes in the network based on the potential events in the network device for each of the operator interactions.

TODs for multiple different features of the network device may be presented to the network device operator. The TODs for the different features together form the TOD space. Examples of logically distinct features for which TODs may be generated include a point-to-multipoint (P2MP) label switched path (LSP), an Internet Protocol (IP) multicast tree, a tunnel packet interface card (PIC), a logical interface (IFL), and the like.

In one example, the disclosure is directed toward a method comprising receiving, with a network device, a request from a network device operator to interact with the network device to perform at least one of a software configuration and a hardware change, in response to the interaction request, generating a TOD including a list of potential events that could occur in the network device in response to the interaction, and a list of potential outcomes in a network of the network device in response to each of the potential events, and displaying the TOD for the requested interaction to the network device operator prior to performing the requested interaction.

In another example, the disclosure is directed to a network device comprising an interface configured to receive a request from a network device operator to interact with the network device to perform at least one of a software configuration and a hardware change, and a control unit configured to generate, in response to the interaction request, a TOD including a list of potential events that could occur in the network device in response to the interaction, and a list of potential outcomes in a network of the network device in response to each of the potential events, and display the TOD for the requested interaction to the network device operator prior to performing the requested interaction.

In a further example, the disclosure is directed to a computer-readable medium comprising instructions that when executed cause a processor of a network device to receive a request from a network device operator to interact with the network device to perform one of a software configuration and a hardware change, in response to the interaction request, generate a TOD including a list of potential events that could occur in the network device in response to the interaction, and a list of potential outcomes in a network of the network device in response to each of the potential events, and display the TOD for the requested interaction to the network device operator prior to performing the requested interaction.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
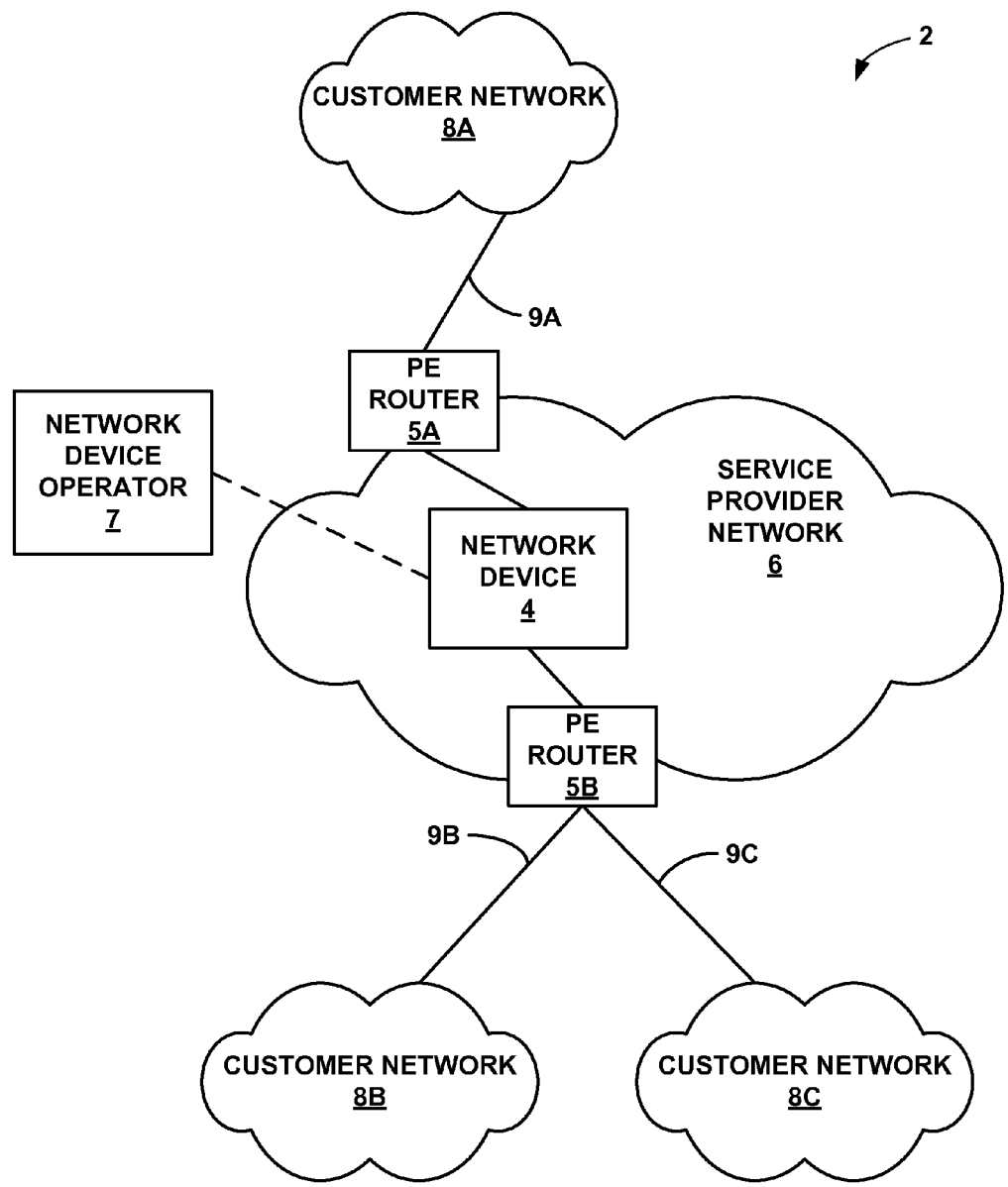
FIG. 1 is an example network system including a service provider network and a network device operator capable of configuring a network device of the service provider network according to the techniques of this disclosure.

FIG. 1 is an example network system including a service provider network 6 and a network device operator 7 capable of configuring a network device 4 of service provider network 6 according to the techniques of this disclosure.

In this example, network device 4 communicates with provider edge (PE) routers 5A and 5B ("PE routers 5") to provide customer networks 8A-8C ("customer networks 8") with access to network 6. Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within the customer networks to communicate with each other. Service provider network 6 may include a variety of network devices other than network device 4 and PE routers 5, such as additional routers, switches, servers, security appliances, wireless access points, and the like.

In the illustrated embodiment, PE router 5A is coupled to customer network 8A via access link 9A and PE router 5B is coupled to customer networks 8B and 8C via access links 9B and 9C, respectively. Customer networks 8 may be networks for geographically separated sites of an enterprise. Each of customer networks 8 may include one or more computing devices (not shown), such as personal computers, laptop computers, handheld computers, workstations, servers, switches, printers, or other devices. The configuration of network 2 illustrated in FIG. 1 is merely exemplary. For example, service provider network 6 may be coupled to any number of customer networks 8. Nonetheless, for ease of description, only customer networks 8A-8C are illustrated in FIG. 1.

Network device operator 7 may control, query and monitor network device 4 via a user interface, e.g., a command line interface (CLI), presented by network device 4. Additionally, network device operator 7 may interact with network device 4 in other ways, such as a user interface presented by an administrative device (not shown in FIG. 1) or by network device 4. Network device operator 7 may interact with network device 4 to enable new software features and/or update hardware features as the features become available. These configuration updates may be needed to allow network device 4 to provide the newest end-user application services and features to computing devices within customer networks 8.

Conventionally, however, network device operator 7 only understands the impact of the new features based on what is described in the technical documentation or industry literature. Dependencies between an internal state of the software running on a network device and the event being performed on the network device by network device operator 7 are non-obvious to network device operator 7. Network device operator 7 does not always know in advance the implications of an interaction with a network device via a software configuration change or a hardware change. An action by network device operator 7, therefore, can end up triggering undesirable events in service provider network 6 that may cause traffic-losses or even network unreachability, depending on the feature, for the customers in customer networks 8.

The techniques of this disclosure enable a network device, such as network device 4, to generate and present a-priori information to network device operator 7 about the implication of an interaction with network device 4 by network device operator 7 before the interaction actually takes place. By providing advance information about the repercussions of a potential future interaction, e.g., a software configuration or hardware change, to be performed on network device 4, network device operator 7 will be provided with information that may be used to make a decision whether to proceed with the interaction. For example, if the advance information indicates that the planned interaction would have an undesirable outcome, e.g., traffic loss or network unreachability, network device operator 7 may decide to not proceed with the interaction in order to prevent the undesirable outcome.

For each logically distinct feature in network device 4, the techniques generate a trigger outcome domain (TOD). Each TOD is defined to include a list of operator interactions, a list of potential outcomes, and a user interface to display the list of potential outcomes for the operator interactions prior to performing any of the interactions. The list of operator interactions includes a list of relevant events in network device 4 that may be triggerable by network device operator 7 interacting with network device 4 to perform at least one of a software configuration and hardware change. The list of potential outcomes includes a list of potential outcomes in service provider network 6 based on the potential events in network device 4 for each of the operator interactions.

TODs for multiple different features of network device 4 may be presented to the network device operator. The TODs for the different features together form the TOD space. Examples of logically distinct features for which TODs may be generated include a point-to-multipoint (P2MP) label switched path (LSP), an Internet Protocol (IP) multicast tree, a tunnel packet interface card (PIC), a logical interface (IFL), and the like. Examples of the list of operator interactions and list of potential outcomes based on the operator interactions for each of the different features are described in more detail below.

Figure 2:
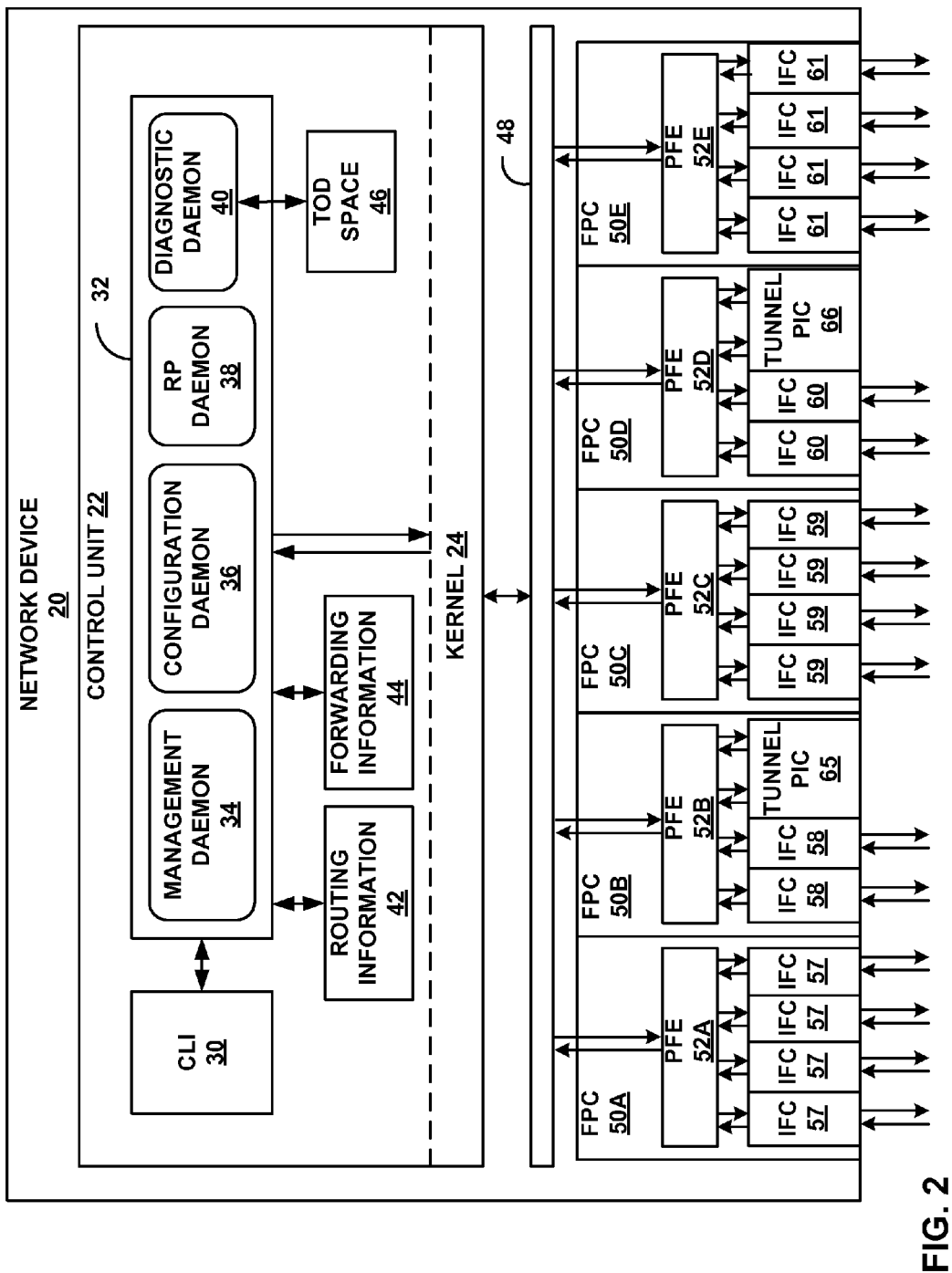
FIG. 2 is a block diagram illustrating an exemplary network device that includes a trigger outcome domain (TOD) space for one or more logically distinct features of the network device in accordance with the techniques of this disclosure.

FIG. 2 is a block diagram illustrating an exemplary network device 20 that includes a trigger outcome domain (TOD) space 46 for one or more logically distinct features of network device 20 in accordance with the techniques of this disclosure. In some cases, network device 20 may operate substantially similar to network device 4 in service provider network 6 from FIG. 1.

As illustrated in FIG. 2, network device 20 includes control unit 22 that provides control plane functionality for the network device. Network device 20 may also include a switch fabric 48 interconnecting a set of flexible packet interface card ("PIC") concentrators 50A-50E ("FPCs 50"), each of which includes at least one of packet forwarding engines 52A-52E ("PFEs 52") that send and receive traffic by a set of interface cards ("IFCs") 57, 58, 59, 60 and 61, respectively, that typically have one or more physical network interfaces (i.e., ports). Some of the PFEs 52 may send and receive traffic by tunnel packet interface cards ("PICs"), e.g., tunnel PICs 65 and 66.

FPCs 50, components included in FPCs 50, and switch fabric 48 collectively provide a forwarding plane for forwarding transit network traffic. Although not shown in FIG. 2, PFEs 52 may each comprise a central processing unit (CPU), memory and one or more programmable packet-forwarding application-specific integrated circuits (ASICs). Switch fabric 48 provides a high-speed interconnect for forwarding incoming data packets between PFEs 52 for transmission over a network.

Control unit 22 provides an operating environment for various protocols that perform control plane functions for PE router 20. For example, daemons 32 comprise user-level processes that run network management software, execute routing protocols to communicate with peer routers, maintain and update one or more routing tables, and create one or more forwarding tables for installation to PFEs 52, among other functions. In the example illustrated in FIG. 2, daemons 32 include a management daemon (MGD) 34, a configuration daemon (configD) 36, a routing protocol daemon (RPD) 38, and a diagnostic daemon (diagD) 40. In some examples, diagD 40, described in more detail below, may comprise a multicast diagnostic daemon (mdiagD). Control unit 22 also includes software for presenting a command line interface (CLI) 30 to a network device operator, such as network device operator 7 from FIG. 1. In other embodiments, control unit 22 may comprise other daemons or software modules.

Daemons 32 operate over and interact with kernel 24, which provides a run-time operating environment for user-level processes. Kernel 24 may comprise, for example, a UNIX operating system derivative such as Linux or Berkeley Software Distribution (BSD). Kernel 24 offers libraries and drivers by which daemons 32 may interact with the underlying system. Kernel 24 comprises a kernel-level library, e.g., a sockets library, by which daemons 32 and other user-level processes or user-level libraries may interact with PFEs 52.

A network device operator may interact with network device 20 via CLI 30, which provides a shell by which the network device operator may modify the configuration of network device 20 using text-based commands. For example, the network device operator may use telnet or secure shell (SSH) protocol from a remote device to access control unit 22 of network device 20 and invoke CLI 30. In other embodiments, the network device operator may communicate with network device 20 via a user interface (not shown in FIG. 2) presented by a separate administrative device or by network device 20.

When the network device operator issues a command at CLI 30, the command is first processed by MGD 34. If necessary, MGD 34 forwards the command to one or more of configD 36 and RPD 38. ConfigD 36 executes any configuration changes to network device 20 initiated by the network device operator. RPD 38 executes one or more interior and/or exterior routing protocols to exchange routing information with other network devices, store received information in routing information 42, and store derived forwarding information in forwarding information 44. RPD 38 configures the forwarding plane to implement packet-forwarding services, add/modify/delete routes, and otherwise modify packet forwarding paths by installing forwarding structures in PFEs 52.

The architecture of network device 20 illustrated in FIG. 2 is shown for exemplary purposes only. The disclosure is not limited to this architecture. In other embodiments, network device 20 may be configured in a variety of ways. In one embodiment, for example, some of the functionally of control unit 22 may be distributed within PFEs 52. The operating environment of control unit 22 may be implemented solely in software or hardware, or may be implemented as a combination of software, hardware or firmware. For example, control unit 22 may include one or more processors that execute software instructions. In that case, control unit 22 may include various software modules or daemons, e.g., daemons 32, executing on an operating system, and may include a non-transitory computer-readable storage device, such as computer memory or hard disk, for storing executable instructions.

A hardware environment of control unit 22 may include a microprocessor (not shown in FIG. 2) that executes program instructions in order to execute both kernel 24 and the operating environment of control unit 22. The microprocessor may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE router 20, e.g., protocols. Control unit 22, in some examples, retrieves and executes the instructions from memory for these aspects.

The techniques of this disclosure enable network device 20 to generate and present a-priori information to a network device operator about the implication of an interaction with network device 20 by the network device operator before the interaction actually takes place. By providing advance information about the repercussions of a potential future interaction, e.g., a software configuration or hardware change, to be performed on network device 20, the network device operator will be provided with information that may be used to make a decision whether to proceed with the interaction. For example, if the advance information indicates that the planned interaction would have an undesirable outcome, e.g., traffic loss or network unreachability, the network device operator may decide to not proceed with the interaction in order to prevent the undesirable outcome.

For each logically distinct feature in network device 20, the techniques generate a trigger outcome domain (TOD). Each TOD is defined to include a list of operator interactions, a list of potential outcomes, and a user interface to display the list of potential outcomes for the operator interactions prior to performing any of the interactions. The list of operator interactions includes a list of relevant events in network device 20 that may be triggerable by the network device operator interacting with network device 20 to perform at least one of a software configuration and hardware change. The list of potential outcomes includes a list of potential outcomes in a network based on the potential events in network device 20 for each of the operator interactions.

The TODs for multiple different features of the network device may be made available to the network device operator. The TODs for the different features together form TOD space 46. TODs for multiple different features of network device 4 may be presented to the network device operator. The TODs for the different features together form the TOD space. Examples of logically distinct features for which TODs may be generated include a point-to-multipoint (P2MP) label switched path (LSP), an Internet Protocol (IP) multicast tree, a tunnel packet interface card (PIC), a logical interface (IFL), and the like. Additional information regarding tunnel PICs is available in MULTI-ROUTER SYSTEM HAVING SHARED NETWORK INTERFACES, U.S. application Ser. No. 12/618,536, filed Nov. 13, 2009, which is incorporated herein by reference in its entirety.

In some cases, the network device operator may have the ability to configure TOD space 46. In this case, the techniques may provide the network device operator the ability to determine a subset of network device features for which to gather the TODs in TOD space 46 for display. The configuration of TOD space 46 is may be especially useful because generating the TOD for a given feature does not come for free but has a certain amount of computational cost. Allowing the network device operator to make a conscious choice about the TODs for which features to include in TOD space 46 gives the network device operator the ability to control the computational cost spent towards TOD computation.

According to the techniques, when the network device operator interacts with network device 20 to perform a software configuration or a hardware change, control unit 22 will first generate a TOD for each of the one or more logically distinct features of network device 20, and then gather the TODs into TOD space 46 for display to the network device operator. For a given TOD in TOD space 46, such as a P2MP LSP TOD, diagD 40 determines a list of relevant events that may be triggered by the network device operator's interaction with network device 20 and a list of potential outcomes of the listed events. TOD space 46 then displays the list of possible outcomes for each of the listed events of the given TOD to the network device operator via a user interface prior to the interaction, e.g., software configuration or hardware change, actually taking place on network device 20.

The information used by diagD 40 to generate the TOD for display may be maintained by RPD 38, PFEs 52, and/or other daemons, software process, or hardware components of network device 20. DiagD 40 may gather and correlate the required information for each of the TODs in order to generate the TOD for display in response to a potential future interaction by the network device operator.

In some cases, such as for the P2MP LSP TOD and the IP multicast TOD, the information needed for a specific TOD includes interface mapping information maintained by RPD 38, and replication tree information maintained by PFEs 52. In those cases, control unit 22 may execute diagD 40 to gather the interface mapping information from RPD 38 and the replication tree information from PFEs 52 via kernel 24. DiagD 40 then correlates the interface mapping information with the replication tree information, and generates the TOD based on the correlated information. In this way, diagD 40 is able to determine the full effect of the interaction on traffic flows, including multicast traffic flows, through the network. Additional information regarding the multicast replication tree is available in DEADLOCK-RESISTANT FABRIC TREE REPLICATION IN A NETWORK DEVICE, U.S. application Ser. No. 12/759,850, filed Apr. 14, 2010, which is incorporated herein by reference in its entirety.

In other cases, such as for the tunnel PIC TOD and the IFL TOD, the information needed for a specific TOD only includes interface mapping information maintained by RPD 38. In one example, diagD 40 may gather the information from RPD 38, and generate the TOD based on the interface mapping information. In another example, control unit 22 may instead execute RPD 38 to generate the TOD based on the interface mapping information already maintained by RPD 38. In this case, a dedicated diagD 40 may not be needed to generate the TODs for features that only depend on interface mapping information, e.g., PICs and IFLs of network device 20. Instead, diagD 40 may only be used to generate TODs for multicast features, e.g., P2MP LSPs or IP multicast trees, in network device 20 that depend on replication tree information from PFEs 52. In this example, diagD 40 may be referred to as a multicast diagnostic daemon (mdiagD).

Several example TODs for different logically distinct features of network device 20 are described in more detail below, including examples of the list of operator interactions and list of potential outcomes based on the operator interactions for each of the different features.

In the example of a P2MP LSP TOD, consider the following subset of operator interactions with network device 20 in the context of a specific P2MP LSP:

a. One of PFEs 52 on network device 20 is disabled through configuration.

b. A line-card is pulled-out from network device 20 which in turn would disable the one or more PFEs 52 residing on that line-card.

The network device operator interactions with network device 20 could result in the following adverse outcomes in the context of affected P2MP LSPs:

a. Traffic loss if the ingress or the egress IFL of the P2MP LSP resides on the one of PFEs 52 that was disabled.

b. Traffic loss if the disabled one of PFEs 52 was a transit PFE in the PFE replication tree used for efficiently forwarding the traffic to all the PFEs 52 that have an outgoing interface associated with the disabled one of PFEs 52.

The techniques propose to display all the label forwarding entries that will suffer traffic loss due to the interactions of the network device operator listed above in TOD space 46, before the operator action is actually performed. Based on this information, whenever the network device operator requests disabling a PFE via configuration or pulling out a line-card from network device 20, the network device operator can review the P2MP LSP TOD displayed in TOD space 46 to easily figure out the P2MP LSP (which corresponds to a specific end-to-end data feed) that will incur a traffic loss.

Based on this knowledge the network device operator may be able to make more informed decisions about PFE software configuration and/or hardware changes. Without the P2MP LSP TOD, the network device operator has no way of knowing how an implementation-specific detail like the PFE replication tree is impacted by a future planned interaction with network device 20.

In the example of an IP Mulicast TOD, consider the following subset of operator interactions with network device 20 in the context of a specific IP multicast (S,G) flow:
  a. One of PFEs 52 on network device 20 is disabled through configuration.
  b. A line-card is pulled-out from network device 20 which in turn would disable the one or more PFEs 52 residing on that line-card.

The operator interactions with network device 20 could result in the following adverse outcomes in the context of affected IP multicast (S,G) trees:
  a. Traffic loss if the ingress or the egress IFL of the IP multicast (S,G) tree resides on the one of PFEs 52 that was disabled.
  b. Traffic loss if the disabled one of PFEs 52 was a transit PFE in the PFE replication tree used for efficiently forwarding the traffic to all the PFEs 52 that have an outgoing interface associated with the disabled one of PFEs 52.

The techniques propose to display all IP multicast (S,G) forwarding entries that will suffer traffic loss due to the interactions of the network device operator listed above, before the network device operator action is actually performed. Based on this information, whenever the network device operator requests disabling a PFE via configuration or pulling out a line-card from network device 20, the network device operator can review the IP multicast TOD displayed in TOD space 46 to easily figure out the IP multicast (S,G) tree (which corresponds to a specific end-to-end data feed) that will incur a traffic loss.

Based on this knowledge the network device operator may be able to make more informed decisions about PFE software configuration and/or hardware changes. Without the IP multicast TOD, the network device operator has no way of knowing how an implementation-specific detail like the PFE replication tree is impacted by a future planned interaction with network device 20.

A tunnel PIC, e.g., tunnel PIC 65 or tunnel PIC 66, comprises a processing board on network device 20 that is used to provide additional encapsulation or looping features for multiple lookups for packets that are sent into the tunnel PIC. Various kinds of logical interfaces (IFLs) may be created using a tunnel PIC, including:
  1. Logical tunnel (lt) interfaces to internally interconnect logical routers (LRs) within a single physical router.
  2. Multicast tunnel (mt) IFLs used to encapsulate CE-CE PIM routing messages and also CE-CE IP multicast data going over the Layer 3 (L3) Virtual Private Network (VPN).
  3. Virtual tunnel (vt) IFLs used to enable traffic delivery to locally connected receivers on a L3 VPN provider edge (PE) router or on a bud-node (e.g., both a transit and an egress node) for a P2MP LSP.

In the example of a tunnel PIC TOD, consider the following subset of network device operator interactions with network device 20 in the context of a given tunnel PIC 65, 66:
  a. Tunnel PIC 65, 66 was taken down by configuration.
  b. Tunnel PIC 65, 66 was taken down by removing the PIC from network device 20:

The operator interactions with network device 20 could result in the following outcomes in the context of the IFLs that are created on top of the tunnel PIC 65, 66:
  a. P2MP LSPs for which network device 20 is a bud-node (e.g., both egress and transit node) would see traffic losses for the local receivers on network device 20. The local receivers experience traffic loss as a result of vt IFLs going down.
  b. If network device 20 is a L3 VPN PE router with IP multicast configured, the Protocol Independent Multicast (PIM) routing messages and IP multicast data traffic destined to the customer edge (CE) routers connected to this PE router would experience traffic loss as a result of mt IFLs going down.
  c. If network device 20 is a PIM designated router (DR), IP multicast traffic generated by directly connected senders will not get forwarded.
  d. If network device 20 is a PIM rendezvous point (RP), then active IP multicast (S,G) flows that are still forwarding on the shared RP tree (RPT) will experience traffic loss.

The techniques propose to display the following information in TOD space 46 that will clearly present the impact of the future planned action of the network device operator taking a tunnel PIC offline, before the tunnel PIC is actually taken offline.
  a. If network device 20 is a bud node for a P2MP LSP, then the tunnel PIC TOD in TOD space 46 lists all such P2MP LSPs that will observe traffic disruption.
  b. If network device 20 is a L3 VPN PE router, the tunnel PIC TOD in TOD space 46 lists all customer IP multicast traffic (i.e., (S,G) routes) going over the L3 VPN that would experience traffic losses.
  c. In addition, if network device 20 is a L3 VPN PE router, the tunnel PIC TOD in TOD space 46 list all the IP multicast <S,G> entries that will experience traffic loss.

In the example of an IFL TOD, consider the following subset of network device operator interactions with network device 20 or a remote network device in the context of a given IFL:
  a. IFL of network device 20 disabled through configuration network device 20.
  b. IFL of network device 20 disabled by PIC removal on network device 20.
  c. IFL of network device 20 disabled via configuration on remote network device.
  d. IFL of network device 20 disabled by PIC removal on remote network device.

The network device operator interactions with network device 20 of a remote network device could result in the following outcomes in the context of the affected IFL:
  a. Traffic loss on routes/flows using the IFL as an egress IFL.
  b. Traffic loss on routes/flows using that IFL as an ingress IFL.

In many-to-one fast re-route (FRR) cases, packet drops may occur due to link utilization getting exceeded for the bypass path.

The techniques propose to display in TOD space 46 the set of all routes that will experience traffic loss due to the future planned IFL configuration performed by the network device operator, before the configuration is actually committed.

In the example of a "take-your-pick" configuration TOD, the techniques propose to display the impact that the following future planned configuration changes will have on the forwarding state (routes/nexthops) for all services and applications that are already installed in PFEs 52 on network device 20:
  a. Border Gateway Protocol (BGP) Subsequent Address Family Identifier (SAFI) TOD: Removing a specific SAFI from a BGP configuration may make some prefixes and L-BGP installed label-routes to be withdrawn.

This may affect a slew of services, including specific virtual routing and forwarding (VRF) tables in an L3 VPN configuration due to the routes getting withdrawn.

b. IFL address-family TOD: Removing a specific address family from an IFL may remove some already installed routes. Which routes will be removed may not be obvious to the network device operator since no indexing of information based on outgoing IFLs is maintained by network device 20.

c. Specific neighbor/peer removal TOD: Removal of specific neighbor or peer network devices will be very obvious a-priori in terms of specific IGP routes getting affected, but there are other services that ride on top of the IGP routes, including LSPs that are already setup, pseudo wires (PWs) that are setup, and other services that ride on top of the LSPs/PWs such as reachability of various unicast L3 VPN CE routes and various customer multicast (S,G) routes. While it is possible to evaluate the routes for each of these other affected services individually for possible impact from a future configuration event, it is more useful to figure the impact upfront and display it in a per-application structured format in TOD space 46 so that the network device operator does not have to individually consider each separate route for possible disruption.

The high level mechanism of RPD 38 and/or diagD 40 to generate TOD space 46 is described in more detail below. In some examples, diagD 40 may be executed in control unit 22 to generate TODs for each of the different features of network device 20 and gather the TODs into TOD space 46 for display to the network device operator. In other cases, RPD 38 may be executed in control space 22 to generate all the TODs in TOD space 46. In still other examples, diagD 40 may be executed to generate TODs for the multicast features that depend on replication tree information maintained in PFEs 52. In the specific case of a P2MP LSP TOD or an IP Multicast TOD, diagD 40 may be referred to as a multicast diagnostic daemon (MDIAGD). Moreover, in other examples, RPD 38 may be executed to generate TODs for the features that only depend on interface mapping information maintained in RPD 38 itself. In the specific case of a tunnel PIC TOD or an IFL TOD, RPD 38 may generate TOD space 46 instead of a dedicated diagnostic daemon.

The techniques for generating TOD space 46 are described below with respect to the example where diagD 40 comprises a MDIAGD that generates a P2MP LSP TOD in TOD space 46. MDIAGD 40 first retrieves interface mapping information from RPD 38. Specifically, MDIAGD 40 receives a P2MP sub-LSP to egress IFL mapping from RPD 38. Once RPD 38 publishes the interface mapping information, MDIAGD 40 retrieves replication tree information from PFEs 52 via kernel 24. Specifically, MDIAGD 40 queries PFEs 52 to learn the set of transit FPCs/PFEs en-route to the sub-LSP egress IFL in the P2MP replication tree maintained by PFEs 52. Once the replication tree information is learned, MDIAGD 40 correlates the interface mapping information with the replication tree information and builds a table that maps FPCs/PFEs to P2MP sub-LSPs. Each entry in this table represents the set of P2MP sub-LSPs impacted if a FPC/PFE were to fail.

The techniques also introduce a CLI show command to display the FPC to sub-LSP mapping table in TOD space 46 in the network device operator. This show command may be handled by MDIAGD 40. In this example, RPD 38 may not implement any externally visible functionality as part of generating TOD space 46. TOD space 46 provides a mechanism through which the network device operator can draw a relation between FPC/PFE failures and its impact on P2MP sub-LSPs transiting network device 20.

RPD 38 provides MDIAGD 40 with an up-to-date mapping of all P2MP sub-LSPs transiting through network device 40 to their respective egress IFLs. MDIAGD 40 may obtain the P2MP sub-LSP to egress IFL mapping in two ways. First, MDIAGD 40 can set up a connection with RPD 38, and RPD 38 will publish triggered updates as P2MP sub-LSP nexthops are added, deleted or modified. Second, MDIAGD 40 can listen for routing socket interface (rtsock) flood nexthop messages, which are generated when either RPD 38 installs new flood nexthops or when, on startup, MDIAGD 40 queries kernel 24 for all flood nexthops. The P2MP key maintained within the flood nexthop already contains the necessary P2MP tunnel information. Using these messages along with the P2MP sub-LSP update messages published by RPD 38, MDIAGD 40 can derive the P2MP sub-LSP to egress IFL mapping. The first approach may be desirable due to the simplicity of implementation from the perspective of MDIAGD 40. The first approach is described in detail below, followed by a detailed description of the second approach.

In the first approach, referred to as the rpd-server approach, MDIAGD 40 connects to RPD 38 to receive P2MP sub-LSP to egress IFL mapping messages. When MDIAGD 40 connects to the RPD server for the first time, the RPD server caches the client connection details. The entire list of P2MP sub-LSPs and their respective egress IFLs is published to MDIAGD 40 during this initial connection stage. After this, RPD 38 will use the existing connection to publish P2MP sub-LSP nexthop updates to MDIAGD 40 asynchronously, as new sub-LSPs are added or existing sub-LSPs are modified. In this approach, MDIAGD 40 relies purely on RPD 38 to learn about P2MP sub-LSPs. While MDIAGD 40 is free to synchronously query RPD 38 at any time, a majority of the communication between MDIAGD 40 and RPD 38, in this approach, consists of asynchronous update messages published by RPD 38. RPD 38 publishes asynchronous update messages on a per P2MP sub-LSP basis. For each P2MP sub-LSP the entire sub-LSP key is published. The details of the message format are explained below.

For every P2MP sub-LSP, the tunnel ID, LSP name and the subgroup ID need to be logged. At network device 20, to uniquely identify a P2MP sub-LSP, the 5-tuple (tunnel ID, LSP ID, source address, destination address, subgroup ID) is necessary. Thus 5-tuple is published by RPD 38 in every sub-LSP update message. The format of the per sub-LSP update message is as follows.

msg=<number of SubLSPs, SubLSP1 [,subLSPn]*>,
    where SubLSP: <Msg type, TunnelId, LSPId, SrcAddr, DestAddr, SubgrpId, ExtendedTunnelId, sub-LSP-Name, IngressIFL-idx, EgressIFL-idx, Indirect NHID, Branch NHID>

The indirect nexthop identifier (NHID) corresponds to the P2MP tunnel in general and is not specific to a P2MP sub-LSP. However, it is required in the P2MP distribution tree computation and hence it is published by RPD 38.

Each sub-LSP update is associated with a message type. The different message types are as follows.

SUB_LSP_ADD: This message is published when an instance of a P2MP sub-LSP comes up. The sub-LSP key along with the sub-LSPName, extendedTunnelId, IngressIFL index, EgressIFL index, Indirect NHID and branch NHID, is published in this message type.

SUB_LSP_DEL: This message is published when a P2MP sub-LSP goes down. Since MDIAGD 40 is already aware of this P2MP sub-LSP, only the sub-LSP key is published in this message type.

SUB_LSP_MODIFY: This message is needed to notify MDIAGD 40 about P2MP sub-LSP branch nexthop changes. The sub-LSP key, the new egressIFL index and the branch NHID are published in this message type.

In addition to the sub-LSP message types, MDIAGD 40 can request information from RPD 38 using synchronous request messages. A typical use case for such messages is when MDIAGD 40 requests RPD 38 for the entire P2MP sub-LSP list. It is not expected that MDIAGD 40 will use these synchronous request messages to retrieve individual P2MP sub-LSPs fields.

The communication between RPD 38 and MDIAGD 40 is as explained below in the following exemplary scenarios. The communication between the MDIAGD 40 and RPD 38 is platform independent. The per sub-LSP information published by RPD 38 to MDIAGD 40 is also platform independent.

In a first scenario, a P2MP sub-LSP is newly signaled. RPD 38 publishes a SUB_LSP_ADD message for the newly signaled P2MP sub-LSP. In a second scenario, P2MP sub-LSP, which uses an existing branch nexthop, is newly signaled. This scenario is identical to the first scenario. Since RPD 38 publishes updates on a per sub-LSP basis, a SUB_LSP_ADD message is published for the newly signaled P2MP sub-LSP.

In a third scenario, an existing P2MP sub-LSP is deleted. RPD 38 publishes a SUB_LSP_DEL message for the sub-LSP that was deleted. In a fourth scenario, P2MP sub-LSP is re-signaled resulting in an egress IFL change. A change in the egress IFL of a P2MP sub-LSP results in RPD 38 deleting the existing branch nexthop, if it is not shared with any other sub-LSP, and installing a new branch nexthop with the new egress IFL. RPD 38 publishes a SUB_LSP_MODIFY message specific to this sub-LSP indicating the change in egress IFL. The new branch NHID is published in this modify message.

In a fifth scenario, a link protecting bypass LSP is signaled for a P2MP sub-LSP. MDIAGD 40 does not learn about the bypass LSP since RPD 38 suppresses this event. RPD 38 suppresses this event because signaling the bypass does not have any effect on the P2MP distribution tree. In a sixth scenario, a link protecting bypass LSP goes into use for a P2MP sub-LSP. When a bypass LSP goes into use at network device 20, the egress IFL for the P2MP sub-LSP is updated to point to the bypass interface. Unlike the fourth scenario, a new branch nexthop is not created to reflect this change. Instead the existing branch nexthop is updated with the new IFL. Hence, in this case, RPD 38 publishes a SUB_LSP_MODIFY message specific to the P2MP sub-LSP for which the bypass is being used, indicating the change in egress IFL. In a seventh scenario, an egress IFL goes down. When an IFL that is not protected goes down, the corresponding sub-LSP control state at network device 20 is deleted. Hence RPD 38 publishes a SUB_LSP_DEL message for every sub-LSP that is deleted.

In an eighth scenario, RPD 38 restarts. When RPD 38 restarts, the RPD server loses the connection details to MDIAGD 40 without which it cannot publish asynchronous triggered updates. Since both approaches rely on asynchronous triggered updates published by RPD 38, MDIAGD 40 should detect a RPD 38 restart event and reestablish the connection once RPD 38 restarts. Upon a restart, the Resource Reservation Protocol (RSVP) will undergo a graceful restart cycle if graceful restart is configured. The control state of RPD 38 is partially frozen during the graceful restart period. Control state and forwarding state of RPD 38 is updated if an existing LSP goes down. This is similar to the third scenario described above. However, new sub-LSPs are not signaled during this phase. While RSVP is in the graceful restart phase, MDIAGD 40 will have up-to-date information to handle CLI 30 requests or FPC 50 failures. In a ninth scenario, MDIAGD 40 restarts. When MDIAGD 40 restarts, it requests RPD 38 for the entire list of P2MP sub-LSPs. After this, RPD 38 will continue to publish triggered updates on a per sub-LSP basis.

One of the important requirements for generating TOD space 46 is that FPC to sub-LSP debug information, displayed through the CLI show command, should work after either MDIAGD 40 or RPD 38 restart and after a routing engine (RE) switchover with or without non-stop routing (NSR). While daemon restart scenarios can be handled, the FPC to P2MP sub-LSP mapping will not be available soon after a RE switchover. Specifically, when a RE switchover is performed with NSR disabled, MDIAGD 40 will not have any knowledge about the P2MP sub-LSPs till RPD 38 builds up the control state. For any FPCs 50 failing in this window, the corresponding set of P2MP sub-LSPs cannot be logged. In this window, CLI 30 might not display any information in TOD space 40.

In the second approach to MDIAGD 40 obtaining the P2MP sub-LSP to egress IFL mapping is the hybrid approach. The hybrid approach requires MDIAGD 40 to register with the rtsock library to receive asynchronous flood nexthop update messages, in addition to the asynchronous update messages published by RPD 38. In this approach, RPD 38 publishes update messages on a per branch nexthop basis. For each branch nexthop change, the list of P2MP sub-LSPs undergoing change are published. For each sub-LSP, the sub group ID and the destination address is published. The rtsock update received for the corresponding P2MP tunnel contains the P2MP tunnel key. MDIAGD 40 will combine the rtsock update message and the message from RPD 38 to form the sub-LSP key. The advantage of this approach over the rpd-server approach discussed above is that RPD 38 publishes a lesser number of messages and the size of each message is also smaller. However, additional logic is needed within MDIAGD 40 to combine the rtsock message from kernel 24 and the sub-LSP update message from RPD 38.

In the second approach, the sub-LSP key is formed in two steps. The tunnel ID, LSP ID and source address are extracted from the rtsock update message and the destination address and subgroup ID are published in the update message from RPD 38. The format of the per branchNH update message is as follows msg=<number of BranchNHObjects, BranchNH1-Object [,BranchNH-n-Object]*>, where BranchNH-Object: <Msg type, BranchNHId, NumSubLSPs, SubLSP1 [,subLSPn]*>, where SubLSP: <DestAddr, SubGrpId, sub-LSPName>.

The communication between RPD 38 and MDIAGD 40 is as explained below in the following exemplary scenarios.

In a first scenario, a P2MP sub-LSP is newly signaled. RPD 38 publishes a branchNH specific message containing a SUB_LSP_ADD message type for the sub-LSP that was signaled. In a second scenario, a P2MP sub-LSP, which uses an existing branch nexthop, is newly signaled. RPD 38 publishes a branchNH specific message containing a SUB_LSP_ADD message type for the sub-LSP that was signaled.

In a third scenario, an existing P2MP sub-LSP is deleted. RPD 38 publishes a branchNH specific message containing a SUB_LSP_DEL message type for the sub-LSP that was deleted. In a fourth scenario, a P2MP sub-LSP is re-signaled resulting in an egress IFL change. A change in the egress IFL of a P2MP branch LSP results in RPD 38 deleting the existing branch nexthop, if it is not shared with any other sub-LSP, and installing a new branch nexthop with the new egress IFL. In this case, RPD 38 publishes a branchNH specific message containing a SUB_LSP_ADD message type for the sub-LSP that was re-signaled.

In a fifth scenario, a link protecting bypass LSP is signaled for a P2MP sub-LSP. MDIAGD 40 does not learn about the bypass LSP since RPD 38 suppresses this event. RPD 38 suppresses this event because signaling the bypass does not have any effect on the P2MP distribution tree. In a sixth scenario, a link protecting bypass LSP goes into use for a P2MP sub-LSP. When a bypass LSP goes into use at network device 20, the egress IFL for the P2MP sub-LSP is updated to point to the bypass interface. Unlike the fourth scenario, a new branch nexthop is not created to reflect this change. Instead the existing branch nexthop is updated with the new IFL. Hence, in this case, RPD 38 publishes a SUB_LSP_MODIFY message specific to the P2MP sub-LSP for which bypass is being used, indicating the change in egress IFL.

In a seventh scenario, an egress IFL goes down. When an IFL that is not protected goes down, the corresponding sub-LSP control state at network device 20 is deleted. In the hybrid approach, a single message for the branchNH corresponding to the egress IFL is published. This branchNH message contains SUB_LSP_DEL messages for every sub-LSP that is deleted.

In general, the techniques of this disclosure generate TODs for each of the multiple logically distinct features of network device 20, and gather the TODs together for display in TOD space 46. In addition, according to the techniques, TOD space 46 may be configurable to include only a sub-set of the TODs for the different features. The TODs provide advance information about the impact of specific future interactions of network device operator with network device 20. In this way, the techniques help to avoid traffic losses and other undesirable outcomes that may be caused by the future planned interaction with the network device.

The techniques provide the following advantages. The techniques give advance information of the outcome of a planned future interaction with network device 20 by a network device operator (e.g., a software configuration change or network device operator triggered hardware event) prior to actually performing the interaction. The techniques display this a-priori information in the TOD space 46 to the network device operator, and the network device operator may determine whether to proceed with the interaction. In this way, the techniques may prevent undesirable and formerly unfathomable effects, such as packet losses, of a network device operator triggered event on network device 20 by providing the advance information to the network device operator.

In addition, routes and nexthops that are installed on network device 20 are discernible based on the route-prefix/label and their nexthop. There usually is not a way to group these routes/nexthops based on other parameters/entities, such as an outgoing interface. For example, given an outgoing interface, the techniques enable RPD 38 and/or diagD 40 to determine all the routes/nexthops using that interface and generate an IFL TOD in TOD space 46 to present the routers/nexthops associated with the interface to a network device operator.

In a live deployment, the network device operator may be interested in figuring out what would be disrupted by taking down the line card for the given outgoing interface of network device 20. Conventionally, to figure out the impact of such an action, the network device operator has to manually evaluate the routes of each application individually, which is cumbersome especially since many of the routes/nexthops rely other underlying routes/nexthops (e.g., in the case of route-resolution for iBGP routes). According to the techniques, RPD 28 and/or diagD 40 generates the IFL TOD to display the impact of the potential future interaction with network device 20. The techniques, therefore, provide a much more easily discernible impact of the future device interaction to the network device operator.

The techniques also provide flexibility to a network device operator to determine an amount of information to display in TOD space 46 in order to give adequate advance information about the impact of a future planned device interaction. In this way, the techniques may make TOD space 46 more usable from an operator's point of view. For example, a network device operator may select the type and number of TODs for the different logically distinct features of network device 20 to include in TOD space 46. The network device operator, therefore, has the ability to control the computational cost spent by network device 20 for computation of TOD space 46.

Figure 3:
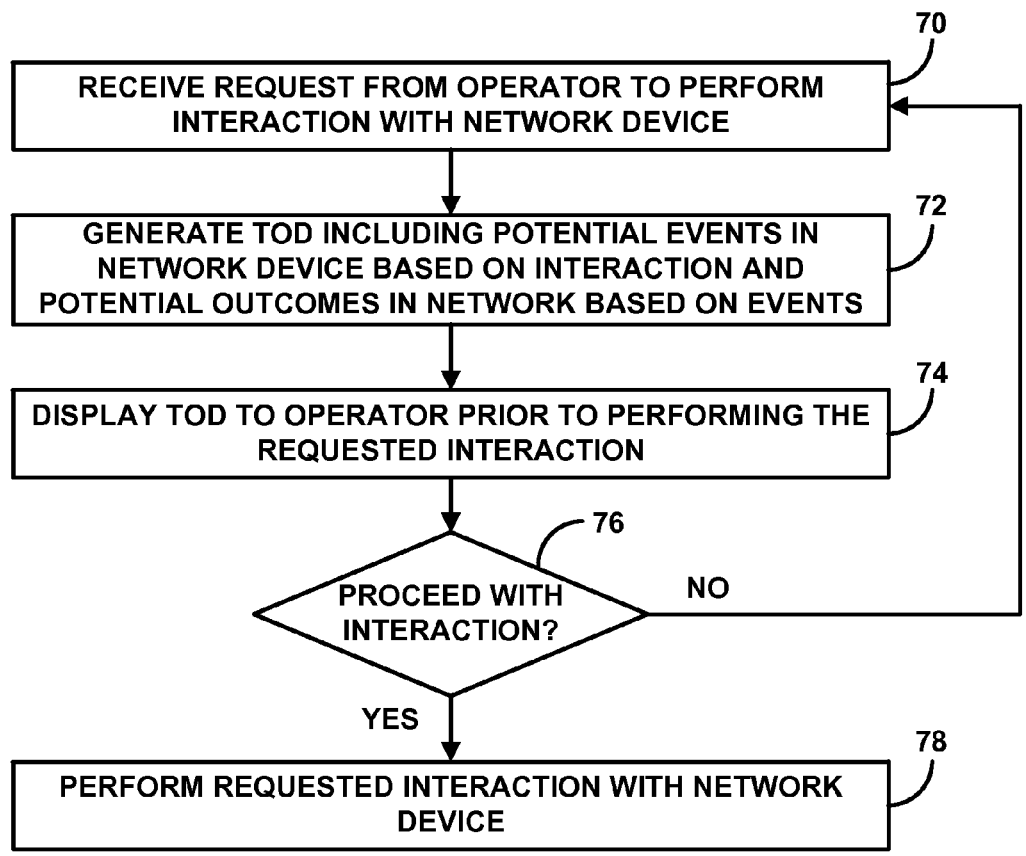
FIG. 3 is a flowchart illustrating an operation of generating TODs for one or more logically distinct features of a network device prior to performing an interaction with the network device.

FIG. 3 is a flowchart illustrating an operation of generating TODs for one or more logically distinct features of a network device prior to performing an interaction with the network device. The operation will be described with respect to network device 20 from FIG. 2.

Network device 20 receives a request from a network device operator to perform an interaction with network device 20, such as a software configuration or a hardware change (70). More specifically, MGD 34 executing in control unit 22 of network device 20 receives the interaction request from the network device operator via CLI 30. Conventionally, MGD 34 may pass the interaction request directly to configD 36 to perform the requested interaction. According to the techniques of this disclosure, however, the interaction request is first sent to diagD 40, or in some cases RPD 38, to generate TOD space 46 to present the impact of the requested interaction to the network device operator before performing the requested interaction.

In response to the interaction request, diagD 40 executes in control unit 22 of network device 20 to generate a TOD for a given feature in network device 20, including a list of potential events that could occur in network device 20 in response to the interaction, and a list of potential outcomes in a network of network device 20 in response to each of the potential events (72). As described in more detail with respect to FIG. 4, diagD 40 may generate the TOD based on at least interface mapping information retrieved from RPD 38. In cases where the TOD is for a multicast feature in network device 20, diagD 40 may generate the TOD based on interface mapping information retrieved from RPD 38 and replication tree information retrieved from PFEs 52.

Once the TOD is generated, diagD 40 displays the TOD for the given feature for the requested interaction in TOD space 46 to the network device operator prior to performing the requested interaction (74). In some cases, diagD 40 may generate and display multiple TODs for different features of network device 20 that are impacted by the requested interaction. For example, diagD 40 may include a TOD for each P2MP LSP, IP Multicast tree, tunnel PIC, and IFL in network device 20 that would be impacted by the future planned software configuration or hardware change.

The network device operator may then review the TOD in order to understand the impact of the requested interaction on network device 20 and on the network of network device 20. Based on the TOD, network device 20 receives an indication whether to proceed with the requested interaction from the network device operator via CLI 30 (76). If network device 20 receives an indication to proceed with the requested interaction (YES branch of 76), then configD 36 executes in control unit 22 of network device 20 to perform the requested interaction. If network device 20 does not receive an indication to proceed with the requested interaction (NO branch of 76), then MGD 34 executing in control unit 22 of network device 20 waits to receive another request from the network device operator to perform an interaction with network device 20 (70).

Figure 4:
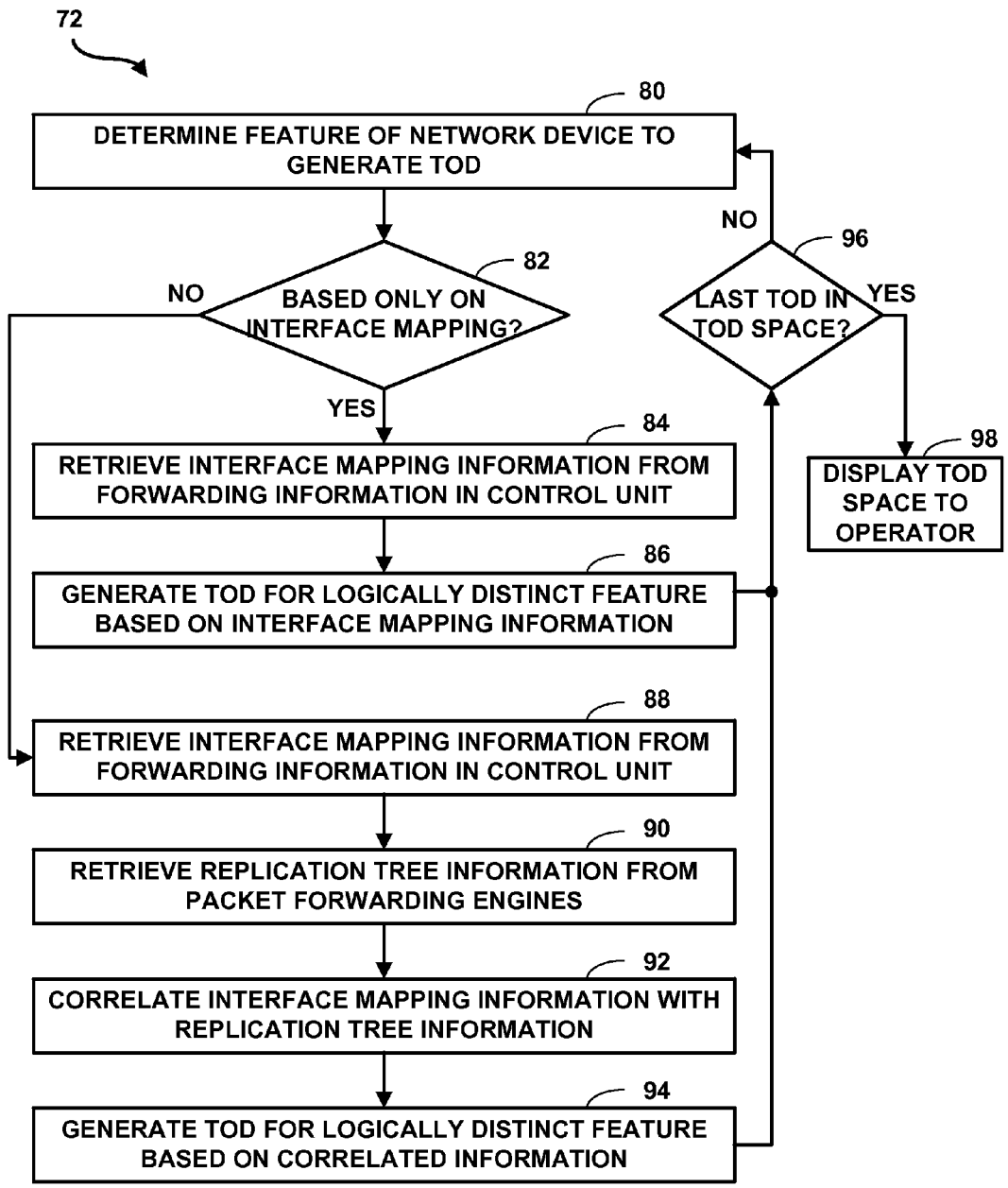
FIG. 4 is a flowchart illustrating an exemplary operation of generating TODs for one or more logically distinct features of the network device in more detail.

FIG. 4 is a flowchart illustrating an exemplary operation of generating TODs for one or more logically distinct features of network device 20, i.e., step 72 from FIG. 3, in more detail. More specifically, FIG. 4 illustrates generating each TOD included in TOD space 46 for network device 20 based on information retrieved from network device 20.

In order to generate the TOD for the requested interaction, diagD 40 first determines the feature of network device 20 for which to generate the TOD (80). For the requested interaction, diagD 40 may generate a separate TOD for each of several different features of network device 20, such as P2MP LSPs, Multicast IP trees, tunnel PICs, and IFLs. The TODs for some features may depend only on interface mapping information maintained by RPD 38. The TODs for other features, e.g., the multicast features, depend on both interface mapping information maintained by RPD 38 and replication tree information maintained by PFEs 52.

According to the techniques, if the TOD for the feature is based only on interface mapping information (YES branch of 82), diagD 40 retrieves the interface mapping information from forwarding information 44 maintained by RPD 38 in control unit 22 of network device 20 (84). DiagD 40 then generates the TOD for the logically distinct feature of network device 20 based on the interface mapping information (86). In this case, a dedicated diagnostic daemon, such as diagD 40, may not be necessary to generate the TOD based only on information maintained by RPD 38. Instead, the TOD may be generated for display in TOD space 46 by RPD 38 itself.

If, on the other hand, the TOD for the feature is based on interface mapping information and replication tree information (NO branch of 82), diagD 40 retrieves the interface mapping information from forwarding information 44 maintained by RPD 38 in control unit 22 of network device 20 (88). DiagD 40 also retrieves the replication tree information from PFEs 52 in a forwarding place of network device 20 (90). Once both the interface mapping information and replication tree information is received, diagD 40 correlates the interface mapping information with the replication tree information (92).

DiagD 40 then generates the TOD for the logically distinct feature of network device 20 based on the correlated information (94). In this case, a dedicated diagnostic daemon, such as diagD 40 may be referred to a multicast diagnostic daemon (MDIAGD), and may be necessary to not avoid requiring RPD 38 to perform additional computations.

In either case, after diagD 40 generates the TOD for display in TOD space 46, diagD 40 determines whether the TOD is the last TOD included in TOD space 46 (96). If the TOD is not the last TOD included in TOD space 46 (NO branch of 96), then diagD 40 determines the next feature of network device 20 for which to generate a TOD (80). If the TOD is the last TOD included in TOD space 46 (YES branch of 96), then diagD 40 displays the TODs included in TOD space 46 to the network device operator (98). In this way, the network device operator may determine whether to proceed with the requested interaction based on the impact information presented in TOD space 46.

Figure 5:
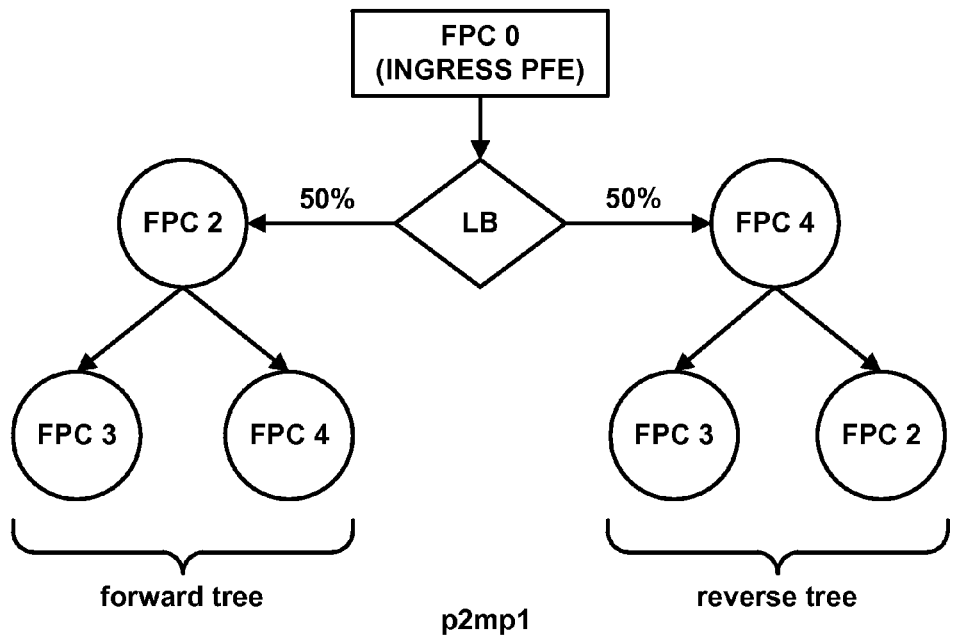
FIG. 5 is a block diagram illustrating forward and reverse trees of Flexible Packet Interface Card (PIC) Concentrators (FPCs) for a first exemplary point-to-multipoint (P2MP) label switched path (LSP) for which TODs are generated.
Figure 6:
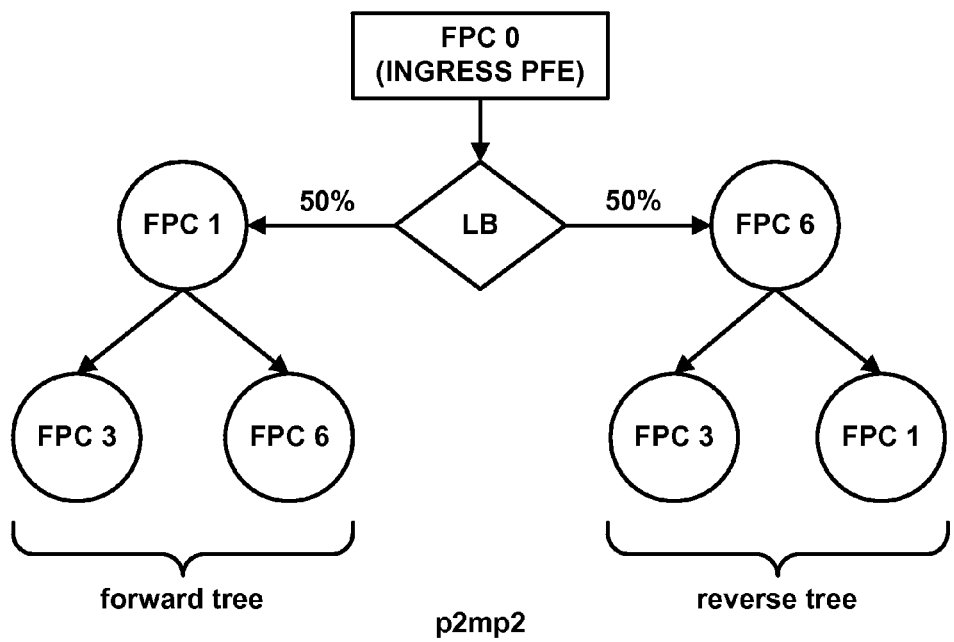
FIG. 6 is a block diagram illustrating forward and reverse trees of FPCs for a second exemplary P2MP LSP for which TODs are generated.

With respect to FIGS. 5 and 6, in the specific case of the P2MP LSP TOD, the CLI configuration according to the techniques of this disclosure enables generation of new SYSLOG message, and enables support of a new CLI operational command, e.g., user@router# set services p2mp-sublsp-correlation. The CLI operational command is introduced to ensure that existing users of RSVP-TE P2MP LSPs do not start seeing the new SYSLOG messages by default. Several exemplary SYSLOG outputs and CLI operational command outputs with respect to interactions impacting p2mp1 illustrated in FIG. 5 and p2mp2 illustrated in FIG. 6 are provided below.

The new SYSLOG tag introduced is referred to as MDIAGD_P2MP_SUBLSP_IMPACTED, with severity WARNING and a facility DAEMON. The new SYSLOG tag is triggered only by FPC failure or offline action. The new SYSLOG tag is not generated for other events such as PIC failure, Interface down/disable, Next-hop change, and the like. The new CLI operational mode show command is introduced to retrieve information about affected sub-LSPs based on FPC and ingress/egress logical interfaces. In some cases, the command may be hidden to avoid sharing proprietary information about multicast implementation with other customers.

show services p2mp-sublsp-correlation fpc <fpc-number>
show services p2mp-sublsp-correlation ingress-interface
    <interface-name>
show services p2mp-sublsp-correlation egress-interface
    <interface-name>

FIG. 5 is a block diagram illustrating forward and reverse trees of FPCs for a first exemplary P2MP LSP, referred to as p2mp1, for which TODs are generated. As shown in FIG. 5, the p2mp1 includes FPC 0 as an ingress PFE and a forward tree with FPC 2 as an intermediate PFE and a FPC 3 and FPC 4 as leaf PFEs. The p2mp1 also includes a reverse tree with FPC 4 as an intermediate PFE and a FPC 2 and FPC 3 as leaf PFEs. The loopback (LB) of p2mp1 sends half of the traffic on the forward tree and half of the traffic on the reverse tree.

FIG. 6 is a block diagram illustrating forward and reverse trees of FPCs for a second exemplary P2MP LSP, referred to as p2mp2, for which TODs are generated. As shown in FIG. 6, the p2mp2 includes FPC 0 as an ingress PFE and a forward tree with FPC 1 as an intermediate PFE and a FPC 3 and FPC 6 as leaf PFEs. The p2mp2 also includes a reverse tree with FPC 6 as an intermediate PFE and a FPC 1 and FPC 3 as leaf PFEs. The loopback (LB) of p2mp2 sends half of the traffic on the forward tree and half of the traffic on the reverse tree.

SYSLOG Output Example 1

In this example, FPC 0 goes down and all sub-LSPs are affected because FPC 0 is the ingress PFE for both P2MP LSPs, p2mp1 and p2mp2.

| FPC 0 goes down with the following Sub-LSPs: | | | | | | | | | |
|---|---|---|---|---|---|---|---|---|---|
| P2MP ID | P2MP Name | Sub-LSP Dest | Sub-LSP Name | Tunnel ID | LSP ID | Source Address | Sub-Group ID | Ingress Interface | Egress Interface |
| 1 | p2mp1 | 30.1.1.1 | toDest1 | 32 | 1 | 20.1.1.1 | 16 | ge-0/0/0.0 | ge-2/0/0.0 |
| 1 | p2mp1 | 30.1.1.2 | toDest2 | 32 | 1 | 20.1.1.1 | 16 | ge-0/0/0.0 | ge-3/0/0.0 |
| 1 | p2mp1 | 30.1.1.3 | toDest3 | 32 | 1 | 20.1.1.1 | 16 | ge-0/0/0.0 | ge-4/0/0.0 |

FPC 0 goes down with the following Sub-LSPs:

| P2MP ID | P2MP Name | Sub-LSP Dest | Sub-LSP Name | Tunnel ID | LSP ID | Source Address | Sub-Group ID | Ingress Interface | Egress Interface |
|---|---|---|---|---|---|---|---|---|---|
| 2 | p2mp2 | 50.1.1.4 | toDest4 | 48 | 2 | 40.1.1.1 | 24 | ge-0/1/0.0 | ge-1/0/0.0 |
| 2 | p2mp2 | 50.1.1.5 | toDest5 | 48 | 2 | 40.1.1.1 | 24 | ge-0/1/0.0 | ge-3/0/0.0 |
| 2 | p2mp2 | 50.1.1.6 | toDest6 | 48 | 2 | 40.1.1.1 | 24 | ge-0/1/0.0 | ge-6/0/0.0 |

May 16 23:46:30 mdiagd[1234]: MDIAGD_P2MP_SUBLSP_IMPACTED: Ingress FPC 0 DOWN, P2MP-ID 1, P2MP-Tunnel-Name p2mp1, Sub-LSP-Dest 30.1.1.1, Sub-LSP-Name toDest1, Tunnel-ID 32a, LSP-ID 1, Src-Addr 20.1.1.1, Sub-Group-ID 16, Ingress-Interface ge-0/0/0.0, Egress-Interface ge-2/0/0.0

May 16 23:46:30 mdiagd[1234]: MDIAGD_P2MP_SUBLSP_IMPACTED: Ingress FPC 0 DOWN, P2MP-ID 1, P2MP-Tunnel-Name p2mp1, Sub-LSP-Dest 30.1.1.2, Sub-LSP-Name toDest2, Tunnel-ID 32 LSP-ID 1, Src-Addr 20.1.1.1, Sub-Group-ID 16, Ingress-Interface ge-0/0/0.0, Egress-Interface ge-3/0/0.0

May 16 23:46:30 mdiagd[1234]: MDIAGD_P2MP_SUBLSP_IMPACTED: Ingress FPC 0 DOWN, P2MP-ID 1, P2MP-Tunnel-Name p2mp1, Sub-LSP-Dest 30.1.1.3, Sub-LSP-Name toDest3, Tunnel-ID 32, LSP-ID 1, Src-Addr 20.1.1.1, Sub-Group-ID 16, Ingress-Interface ge-0/0/0.0, Egress-Interface ge-4/0/0.0

.
.
.

May 16 23:46:30 mdiagd[1234]: MDIAGD_P2MP_SUBLSP_IMPACTED: Ingress FPC 0 DOWN, P2MP-ID 2, P2MP-Tunnel-Name p2mp2, Sub-LSP-Dest 50.1.1.6, Sub-LSP-Name toDest6, Tunnel-ID 48, LSP-ID 2, Src-Addr 40.1.1.1, Sub-Group-ID 24, Ingress-Interface ge-0/1/0.0, Egress-Interface ge-6/0/0.0

SYSLOG Output Example 2

In this example, FPC 3 goes down and only two sub-LSPs are affected because FPC 3 is not the root or intermediate PFE for either the forward or the reverse tree for the two P2MP LSPs, p2mp1 and p2mp2.

FPC 3 goes down with the following Sub-LSPs:

| P2MP ID | P2MP Name | Sub-LSP Dest | Sub-LSP Name | Tunnel ID | LSP ID | Source Address | Sub-Group ID | Ingress Interface | Egress Interface |
|---|---|---|---|---|---|---|---|---|---|
| 1 | p2mp1 | 30.1.1.1 | toDest 1 | 32 | 1 | 20.1.1.1 | 16 | ge-0/0/0.0 | ge-2/0/0.0 |
| 1 | p2mp1 | 30.1.1.2 | toDest2 | 32 | 1 | 20.1.1.1 | 16 | ge-0/0/0.0 | ge-3/0/0.0 |
| 1 | p2mp1 | 30.1.1.3 | toDest3 | 32 | 1 | 20.1.1.1 | 16 | ge-0/0/0.0 | ge-4/0/0.0 |
| 2 | p2mp2 | 50.1.1.4 | toDest4 | 48 | 2 | 40.1.1.1 | 24 | ge-0/1/0.0 | ge-1/0/0.0 |
| 2 | p2mp2 | 50.1.1.5 | toDest5 | 48 | 2 | 40.1.1.1 | 24 | ge-0/1/0.0 | ge-3/0/0.0 |
| 2 | p2mp2 | 50.1.1.6 | toDest6 | 48 | 2 | 40.1.1.1 | 24 | ge-0/1/0.0 | ge-6/0/0.0 |

May 16 23:46:30 mdiagd[1234]: MDIAGD_P2MP_SUBLSP_IMPACTED: Egress FPC 3 DOWN, P2MP-ID 1, P2MP-Tunnel-Name p2mp1, Sub-LSP-Dest 30.1.1.2, Sub-LSP-Name toDest2, Tunnel-ID 32, LSP-ID 1, Src-Addr 20.1.1.1, Sub-Group-ID 16, Ingress-Interface ge-0/0/0.0, Egress-Interface ge-3/0/0.0
May 16 23:46:30 mdiagd[1234]: MDIAGD_P2MP_SUBLSP_IMPACTED: Egress FPC 3 DOWN, P2MP-ID 2, P2MP-Tunnel-Name p2mp2, Sub-LSP-Dest 50.1.1.5, Sub-LSP-Name toDest5, Tunnel-ID 48, LSP-ID 2, Src-Addr 40.1.1.1, Sub-Group-ID 24, Ingress-Interface ge-0/1/0.0, Egress-Interface ge-3/0/0.0

SYSLOG Output Example 3

In this example FPC 2 goes down and all sub-LSPs of p2mp1 are affected because FPC 2 is the root of the forward tree for p2mp1.

FPC 2 goes down with the following Sub-LSPs:

| P2MP ID | P2MP Name | Sub-LSP Dest | Sub-LSP Name | Tunnel ID | LSP ID | Source Address | Sub-Group ID | Ingress Interface | Egress Interface |
|---|---|---|---|---|---|---|---|---|---|
| 1 | p2mp1 | 30.1.1.1 | toDest1 | 32 | 1 | 20.1.1.1 | 16 | ge-0/0/0.0 | ge-2/0/0.0 |
| 1 | p2mp1 | 30.1.1.2 | toDest2 | 32 | 1 | 20.1.1.1 | 16 | ge-0/0/0.0 | ge-3/0/0.0 |
| 1 | p2mp1 | 30.1.1.3 | toDest3 | 32 | 1 | 20.1.1.1 | 16 | ge-0/0/0.0 | ge-4/0/0.0 |
| 2 | p2mp2 | 50.1.1.4 | toDest4 | 48 | 2 | 40.1.1.1 | 24 | ge-0/1/0.0 | ge-1/0/0.0 |
| 2 | p2mp2 | 50.1.1.5 | toDest5 | 48 | 2 | 40.1.1.1 | 24 | ge-0/1/0.0 | ge-3/0/0.0 |
| 2 | p2mp2 | 50.1.1.6 | toDest6 | 48 | 2 | 40.1.1.1 | 24 | ge-0/1/0.0 | ge-6/0/0.0 |

May 16 23:46:30 mdiagd[1234]: MDIAGD_P2MP_SUBLSP_IMPACTED: Egress FPC 2 DOWN, P2MP-ID 1, P2MP-Tunnel-Name p2mp1, Sub-LSP-Dest 30.1.1.1, Sub-LSP-Name toDest1, Tunnel-ID 32, LSP-ID 1, Src-Addr 20.1.1.1, Sub-Group-ID 16, Ingress-Interface ge-0/0/0.0, Egress-Interface ge-2/0/0.0
May 16 23:46:30 mdiagd[1234]: MDIAGD_P2MP_SUBLSP_IMPACTED: Intermediate FPC 2 DOWN, P2MP-ID 1, P2MP-Tunnel-Name p2mp 1, Sub-LSP-Dest 30.1.1.2, Sub-LSP-Name toDest2, Tunnel-ID 32, LSP-ID 1, Src-Addr 20.1.1.1, Sub-Group-ID 16, Ingress-Interface ge-0/0/0.0, Egress-Interface ge-3/0/0.0
May 16 23:46:30 mdiagd[1234]: MDIAGD_P2MP_SUBLSP_IMPACTED: Intermediate FPC 2 DOWN, P2MP-ID 1, P2MP-Tunnel-Name p2mp1, Sub-LSP-Dest 30.1.1.3, Sub-LSP-Name toDest3, Tunnel-ID 32, LSP-ID 1, Src-Addr 20.1.1.1, Sub-Group-ID 16, Ingress-Interface ge-0/0/0.0, Egress-Interface ge-4/0/0.0

CLI Operational Command Output Example 1

In this example, FPC 0 does down and all sub-LSPs are affected because FPC 0 is the ingress PFE for both P2MP LSPs, p2mp1 and p2mp2.

| user@router> show services p2mp-sublsp-correlation fpc 0 ||||||||||
| --- | --- | --- | --- | --- | --- | --- | --- | --- | --- |
| P2MP ID | P2MP Name | Sub-LSP Dest | Sub-LSP Name | Tunnel ID | LSP ID | Source Address | Sub-Group ID | Ingress Interface | Egress Interface | FPC Role |
| 1 | p2mp1 | 30.1.1.1 | toDest1 | 32 | 1 | 20.1.1.1 | 16 | ge-0/0/0.0 | ge-2/0/0.0 | Ingress |
| 1 | p2mp1 | 30.1.1.2 | toDest2 | 32 | 1 | 20.1.1.1 | 16 | ge-0/0/0.0 | ge-3/0/0.0 | Ingress |
| 1 | p2mp1 | 30.1.1.3 | toDest3 | 32 | 1 | 20.1.1.1 | 16 | ge-0/0/0.0 | ge-4/0/0.0 | Ingress |
| 2 | p2mp2 | 50.1.1.4 | toDest4 | 48 | 2 | 40.1.1.1 | 24 | ge-0/1/0.0 | ge-1/0/0.0 | Ingress |
| 2 | p2mp2 | 50.1.1.5 | toDest5 | 48 | 2 | 40.1.1.1 | 24 | ge-0/1/0.0 | ge-3/0/0.0 | Ingress |
| 2 | p2mp2 | 50.1.1.6 | toDest6 | 48 | 2 | 40.1.1.1 | 24 | ge-0/1/0.0 | ge-6/0/0.0 | Ingress |

CLI Operational Command Output Example 2

In this example, FPC 3 goes down and only two sub-LSPs are affected because FPC 3 is not the root or intermediate PFE for either the forward or the reverse tree for the two P2MP LSPs, p2mp1 and p2mp2.

| user@router> show services p2mp-sublsp-correlation fpc 3 ||||||||||
| --- | --- | --- | --- | --- | --- | --- | --- | --- | --- |
| P2MP ID | P2MP Name | Sub-LSP Dest | Sub-LSP Name | Tunnel ID | LSP ID | Source Address | Sub-Group ID | Ingress Interface | Egress Interface | FPC Role |
| 1 | p2mp1 | 30.1.1.2 | toDest2 | 32 | 1 | 20.1.1.1 | 16 | ge-0/0/0.0 | ge-3/0/0.0 | Egress |
| 2 | p2mp2 | 50.1.1.5 | toDest5 | 48 | 2 | 40.1.1.1 | 24 | ge-0/1/0.0 | ge-3/0/0.0 | Egress |

CLI Operational Command Output Example 3

In this example, FPC 2 goes down and all sub-LSPs of p2mp1 are affected because FPC 2 is the root of the forward tree for p2mp1.

| user@router> show services p2mp-sublsp-correlation fpc 2 ||||||||||
| --- | --- | --- | --- | --- | --- | --- | --- | --- | --- |
| P2MP ID | P2MP Name | Sub-LSP Dest | Sub-LSP Name | Tunnel ID | LSP ID | Source Address | Sub-Group ID | Ingress Interface | Egress Interface | FPC Role |
| 1 | p2mp1 | 30.1.1.1 | toDest1 | 32 | 1 | 20.1.1.1 | 16 | ge-0/0/0.0 | ge-2/0/0.0 | Egress |
| 1 | p2mp1 | 30.1.1.2 | toDest2 | 32 | 1 | 20.1.1.1 | 16 | ge-0/0/0.0 | ge-3/0/0.0 | Intermediate |
| 1 | p2mp1 | 30.1.1.3 | toDest3 | 32 | 1 | 20.1.1.1 | 16 | ge-0/0/0.0 | ge-4/0/0.0 | Intermediate |

CLI Operational Command Output Example 4

In this example, the ingress interface on FPC 0 for p2mp1 goes down and all sub-LSPs of p2mp1 are affected because FPC 0 is the ingress PFE for p2mp1.

| | | | user@router> show services p2mp-sublsp-correlation ingress-interface ge-0/0/0.0 | | | | | | |
|---|---|---|---|---|---|---|---|---|---|
| P2MP ID | P2MP Name | Sub-LSP Dest | Sub-LSP Name | Tunnel ID | LSP ID | Source Address | Sub-Group ID | Ingress Interface | Egress Interface |
| 1 | p2mp1 | 30.1.1.1 | toDest1 | 32 | 1 | 20.1.1.1 | 16 | ge-0/0/0.0 | ge-2/0/0.0 |
| 1 | p2mp1 | 30.1.1.2 | toDest2 | 32 | 1 | 20.1.1.1 | 16 | ge-0/0/0.0 | ge-3/0/0.0 |
| 1 | p2mp1 | 30.1.1.3 | toDest3 | 32 | 1 | 20.1.1.1 | 16 | ge-0/0/0.0 | ge-4/0/0.0 |

CLI Operational Command Output Example 5

In this example, the egress interface on FPC 3 goes down and only two sub-LSPs are affected because FPC 3 is not the root or intermediate PFE for either the forward or the reverse tree for the two P2MP LSPs, p2mp1 and p2mp2.

| | | | user@router> show services p2mp-sublsp-correlation egress-interface ge-3/0/0.0 | | | | | | |
|---|---|---|---|---|---|---|---|---|---|
| P2MP ID | P2MP Name | Sub-LSP Dest | Sub-LSP Name | Tunnel ID | LSP ID | Source Address | Sub-Group ID | Ingress Interface | Egress Interface |
| 1 | p2mp1 | 30.1.1.2 | toDest2 | 32 | 1 | 20.1.1.1 | 16 | ge-0/0/0.0 | ge-3/0/0.0 |
| 2 | p2mp2 | 50.1.1.5 | toDest5 | 48 | 2 | 40.1.1.1 | 24 | ge-0/1/0.0 | ge-3/0/0.0 |

Various examples have been described. Specifically, various examples of a P2MP LSP TOD have been described. Similarly, the techniques enable a TOD to be output for each of the logically distinct features of a network device including CLI commands and a user-interface display to display the potential outcomes of a requested interaction with the network device to a network device operator. These and other examples are within the scope of the following claims.

The invention claimed is:

1. A method comprising:
   receiving, with a network device included in a network, a request from a network device operator to interact with the network device to perform at least one of a software configuration or a hardware change;
   in response to the interaction request, generating a trigger outcome domain (TOD) for a logically distinct feature of the network device including a list of potential events that could occur in the network device in response to the interaction, the list of potential events including disabling or removing at least one forwarding component in a forwarding plane of the network device, and a list of potential outcomes in the network in response to each of the potential events, the list of potential outcomes including traffic loss on one or more routes through the network associated with the at least one forwarding component in the forwarding plane of the network device, wherein generating the TOD comprises retrieving interface mapping information for the network device from forwarding information maintained in a control unit of the network device and generating the TOD based at least on the retrieved interface mapping information; and
   displaying the TOD for the requested interaction to the network device operator prior to performing the requested interaction.

2. The method of claim 1, further comprising combining TODs for two or more logically distinct features of the network device into a TOD space.

3. The method of claim 2, further comprising, in response to commands from the network device operator, configuring the TOD space to include TODs for a particular subset of the logically distinct features of the network device.

4. The method of claim 1, wherein generating the TOD for the logically distinct feature of the network device comprises generating the TOD for one of a point-to-multipoint (P2MP) label switched path (LSP), an Internet Protocol (IP) multicast tree, a tunnel packet interface card (PIC), or a logical interface (IFL).

5. The method of claim 1, wherein the list of potential events comprises at least one of disabling a packet forwarding engine (PFE), disabling a tunnel packet interface card (PIC), or disabling a logical interface (IFL) in the forwarding plane of the network device via the software configuration, or removing a line card or removing a PIC in the forwarding plane of the network device via the hardware change.

6. The method of claim 5, wherein the list of potential outcomes in response to the potential events comprises traffic loss on one or more routes through the network associated with at least one of the disabled PFE, disabled tunnel PIC, disabled IFL, removed line card, or removed PIC in the forwarding plane of the network device.

7. The method of claim 1, wherein generating the TOD comprises:
   retrieving replication tree information for the network from one or more packet forwarding engines (PFEs) of the network device; and
   generating the TOD based on the retrieved interface mapping information and the retrieved replication tree information.

8. The method of claim 7, further comprising:
   correlating the interface mapping information from the control unit with the replication tree information from the PFEs; and
   generating the TOD based on the correlated information.

9. A network device included in a network, the network device comprising:
   an interface configured to receive a request from a network device operator to interact with the network device to perform at least one of a software configuration or a hardware change; and
   a control unit configured to:
     generate, in response to the interaction request, a trigger outcome domain (TOD) for a logically distinct feature of the network device including a list of potential events that could occur in the network device in response to the interaction, the list of potential events including disabling or removing at least one forwarding component in a forwarding plane of the network device, and a list of potential outcomes in the network in response to each of the potential events, the list of potential outcomes including traffic loss on one or more routes through the network associated with the at least one forwarding component in the forwarding plane of the network device, wherein the control unit retrieves interface mapping information for the network device from forwarding information maintained in the control unit of the network device and generates the TOD based at least on the retrieved interface mapping information, and display the TOD for the requested interaction to the network device operator prior to performing the requested interaction.

10. The network device of claim 9, wherein the control unit combines TODs for two or more logically distinct features of the network device into a TOD space.

11. The network device of claim 10, wherein the control unit configures, in response to commands from the network device operator, the TOD space to include TODs for a particular subset of the logically distinct features of the network device.

12. The network device of claim 9, wherein the control unit generates the TOD for one of a point-to-multipoint (P2MP) label switched path (LSP), an Internet Protocol (IP) multicast tree, a tunnel packet interface card (PIC), or a logical interface (IFL).

13. The network device of claim 9, wherein the list of potential events comprises at least one of disabling a packet forwarding engine (PFE), disabling a tunnel packet interface card (PIC), or disabling a logical interface (IFL) in the forwarding plane of the network device via the software configuration, or removing a line card or removing a PIC in the forwarding plane of the network device via the hardware change.

14. The network device of claim 13, wherein the list of potential outcomes in response to the potential events comprises traffic loss on one or more routes through the network associated with at least one of the disabled PFE, the disabled tunnel PIC, the disabled IFL, the removed line card, or the removed PIC in the forwarding plane of the network device.

15. The network device of claim 9, wherein the control unit:
retrieves replication tree information for the network from one or more packet forwarding engines (PFEs) of the network device; and
generates the TOD based on the retrieved interface mapping information and the retrieved replication tree information.

16. The network device of claim 15, wherein the control unit correlates the interface mapping information from the control unit with the replication tree information from the PFEs, and generates the TOD based on the correlated information.

17. The network device of claim 9, wherein the control unit executes a diagnostic daemon configured to generate the TOD and display the TOD for the requested interaction to the network device operator prior to performing the requested interaction.

18. The network device of claim 17, wherein the diagnostic daemon retrieves the interface mapping information from a routing protocol daemon, and generates the TOD based at least on the interface mapping information retrieved from the routing protocol daemon.

19. A non-transitory computer-readable medium comprising instructions that when executed cause a processor of a network device included in a network to:
receive a request from a network device operator to interact with the network device to perform one of a software configuration or a hardware change;
in response to the interaction request, generate a trigger outcome domain (TOD) for a logically distinct feature of the network device including a list of potential events that could occur in the network device in response to the interaction, the list of potential events including disabling or removing at least one forwarding component in a forwarding plane of the network device, and a list of potential outcomes in the network in response to each of the potential events, the list of potential outcomes including traffic loss on one or more routes through the network associated with the at least one forwarding component in the forwarding plane of the network device, wherein the instructions cause the processor to retrieve interface mapping information for the network device from forwarding information maintained in a control unit of the network device, and generate the TOD based at least on the retrieved interface mapping information; and
display the TOD for the requested interaction to the network device operator prior to performing the requested interaction.

20. The non-transitory computer-readable medium of claim 19, wherein the instructions cause the processor to combine TODs for two or more logically distinct features of the network device into a TOD space.

21. The non-transitory computer-readable medium of claim 20, further comprising, in response to commands from the network device operator, instructions that cause the processor to configure the TOD space to include TODs for a particular subset of the logically distinct features of the network device.

22. The non-transitory computer-readable medium of claim 19, wherein the instructions cause the processor to:
retrieve replication tree information for the network from one or more packet forwarding engines (PFEs) of the network device; and
generate the TOD based on the retrieved interface mapping information and the retrieved replication tree information.

23. The non-transitory computer-readable medium of claim 22, further comprising instructions that cause the processor to:
correlate the interface mapping information from the control unit with the replication tree information from the PFEs; and
generate the TOD based on the correlated information.

* * * * *